US012186861B2

(12) United States Patent
Chang

(10) Patent No.: US 12,186,861 B2
(45) Date of Patent: Jan. 7, 2025

(54) SPARK PLUG WRENCH

(71) Applicant: Po-Yen Chang, Taichung (TW)

(72) Inventor: Po-Yen Chang, Taichung (TW)

( * ) Notice: Subject to any disclaimer, the term of this patent is extended or adjusted under 35 U.S.C. 154(b) by 323 days.

(21) Appl. No.: 17/832,312

(22) Filed: Jun. 3, 2022

(65) Prior Publication Data

US 2023/0390900 A1 Dec. 7, 2023

(51) Int. Cl.
*B25B 13/48* (2006.01)

(52) U.S. Cl.
CPC .................................. *B25B 13/483* (2013.01)

(58) Field of Classification Search
CPC ....... B25B 13/02; B25B 13/06; B25B 13/481; B25B 13/483; B25B 13/58; B25B 15/001; B25B 23/0021; B25B 23/0035; B25B 23/0042; B25B 23/108; B25B 23/16; B25G 1/00; B25G 1/005; B25G 1/025; B25G 3/00; B25G 3/02; B25G 3/12
See application file for complete search history.

(56) References Cited

U.S. PATENT DOCUMENTS 2,752,811 A * 7/1956 Wenchel ............... B25B 13/483 81/125
3,924,492 A * 12/1975 Bray ..................... B25B 13/483 81/124.6
2009/0211408 A1* 8/2009 Peng ..................... B25B 13/483 81/125
2013/0186244 A1* 7/2013 Lin ........................ B25G 1/005 279/46.7
2015/0224633 A1* 8/2015 Alavi .................... B25B 23/108 81/125

FOREIGN PATENT DOCUMENTS

TW M446070 2/2013

* cited by examiner

*Primary Examiner* — Robert J Scruggs
(74) *Attorney, Agent, or Firm* — Muncy, Geissler, Olds & Lowe, P.C.

(57) ABSTRACT

A spark plug wrench is provided, including: a tubular body, including a working portion configured to be connected with a driving tool and a driving portion including a connection hole, the working portion including an assembling hole in communication with the connection hole; a socket base, disposed in the assembling hole, including a large diameter section radially abutted within the assembling hole, a small diameter section, a receiving hole configured for insertion of a spark plug, and receiving portions; and a plurality of positioning units, each of the plurality of positioning units including an elastic member and a positioning member, the elastic member and the positioning member being received in the receiving portion, the elastic member urging the positioning member so that the positioning member at least partially projects within the receiving hole for being engaged within a grooved portion of the spark plug.

8 Claims, 11 Drawing Sheets

SPARK PLUG WRENCH

BACKGROUND OF THE INVENTION

Field of the Invention

The present invention relates to a spark plug wrench.

Description of the Prior Art

When the spark plug is disassembled, a socket tool is connected to the hex nut of the spark plug to unscrew the spark plug. It is also difficult to reach out and take out the spark plug under the narrow environment. The conventional socket tool, such as that disclosed in TW M446070, includes a cylindrical body and a clamping ring, and the clamping ring is in a circular shape so that the spark plug can be releasably clamped by the clamping ring.

However, the retaining ring of the conventional socket tool engages within grooves of the cylindrical body to avoid disengagement. It is complicated to form the grooves on the cylindrical body and to form a plurality of convex portions on the clamping ring, and the clamping ring is easy to be deformed and broken due to the torque force and the axial action force. Moreover, there only small clamping force provided to clamp the spark plug by the clamping ring which is a long sheet-shaped spring, so that the spark plug can disengage from the conventional socket tool easily.

The present invention is, therefore, arisen to obviate or at least mitigate the above-mentioned disadvantages.

SUMMARY OF THE INVENTION

The main object of the present invention is to provide a spark plug wrench which has a simple structure and can stably hold a spark plug during disassembling of the spark plug.

To achieve the above and other objects, the present invention provides a spark plug wrench is provided, including: a tubular body, defining an axis, including a working portion and a driving portion arranged along a direction in which the axis extends, the working portion having an axial dimension larger than an axial dimension of the driving portion, the driving portion being configured to be connected with a driving tool, the driving portion including a connection hole, the working portion including an assembling hole which is non-circular, the assembling hole including a first inner diametric dimension, the assembling hole being in communication with the connection hole; a socket base, disposed in the assembling hole, including a large diameter section, a small diameter section, a receiving hole and a plurality of receiving portions, the large diameter section and the small diameter section arranged along a direction in which the axis extends, the large diameter section having a first outer diametric dimension larger than a second outer diametric dimension of the small diameter section, the first outer diametric dimension being larger than the first inner diametric dimension, the large diameter section being radially abutted against an inner wall of the assembling hole, the receiving hole being configured for insertion of a spark plug, the plurality of receiving portions being transverse to the axis and inserted to the socket base; and a plurality of positioning units, each of the plurality of positioning units including an elastic member and a positioning member, the elastic member and the positioning member being received in the receiving portion, the elastic member urging the positioning member so that the positioning member at least partially projects within the receiving hole for being engaged within a grooved portion of the spark plug.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 7 and 3A for a preferable embodiment of the present invention. A spark plug wrench 1 of the present invention includes a tubular body 10, a socket base 20 and a plurality of positioning units 30.

Figure 4:
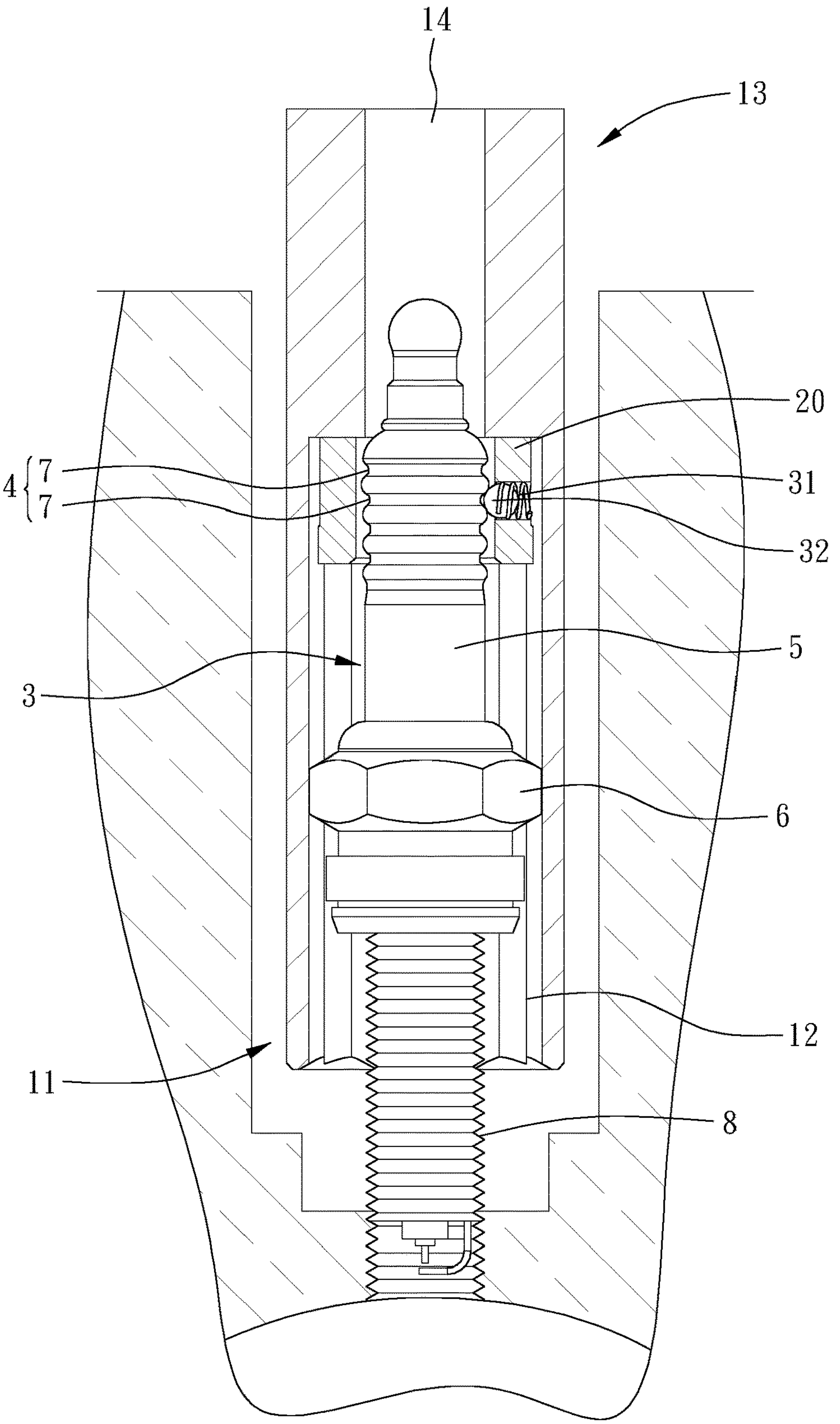
FIG. 4 is a drawing showing operation of the first preferable embodiment of the present invention.
Figure 5:
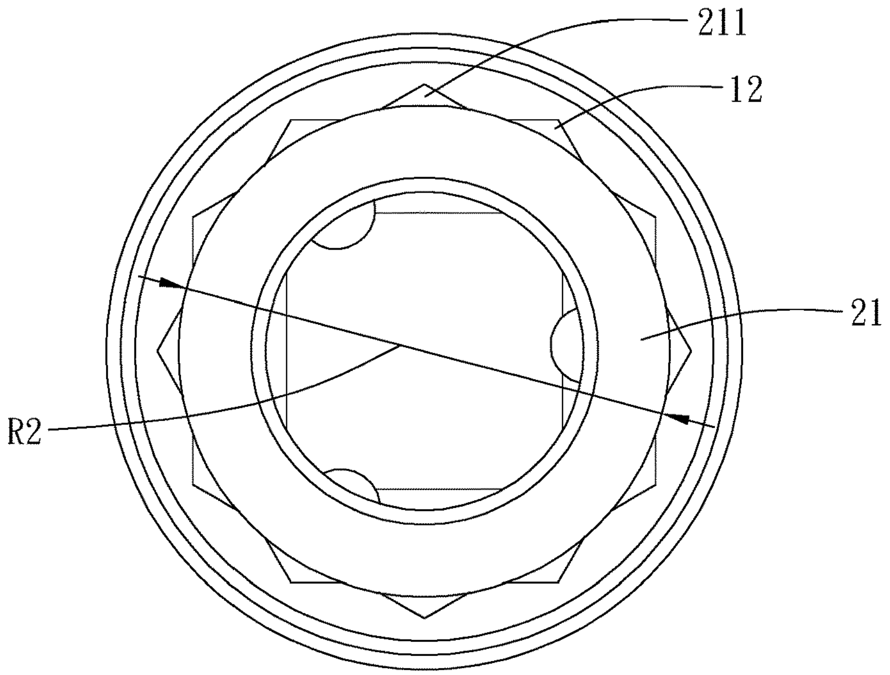
FIG. 5 is a top view showing a socket base not assembled within an assembling hole according to the first preferable embodiment of the present invention.
Figure 6:
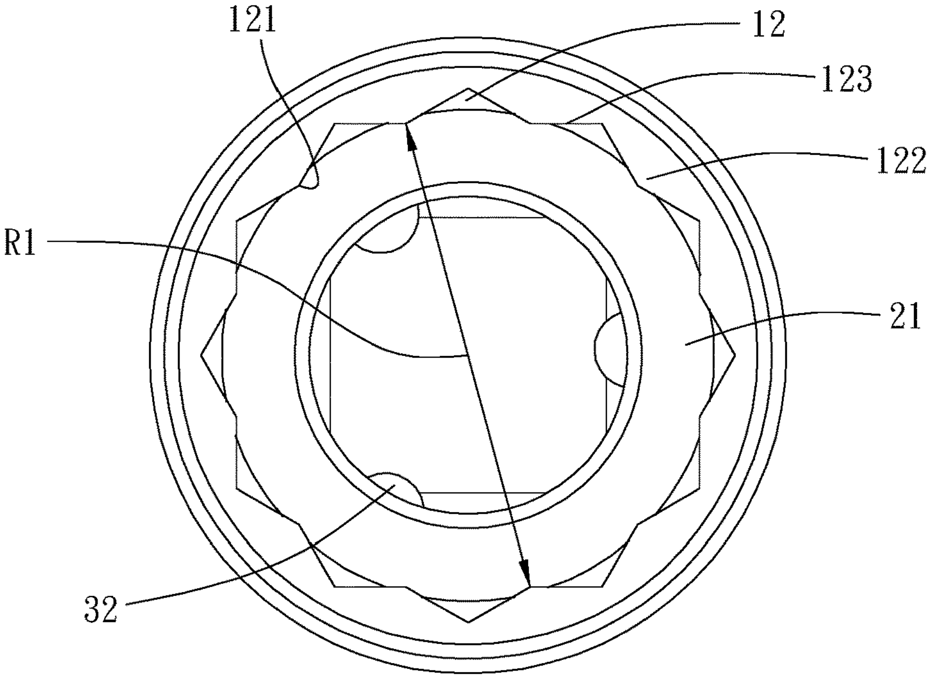
FIG. 6 is a top view showing the socket base assembled within the assembling hole according to the first preferable embodiment of the present invention.
Figure 7:
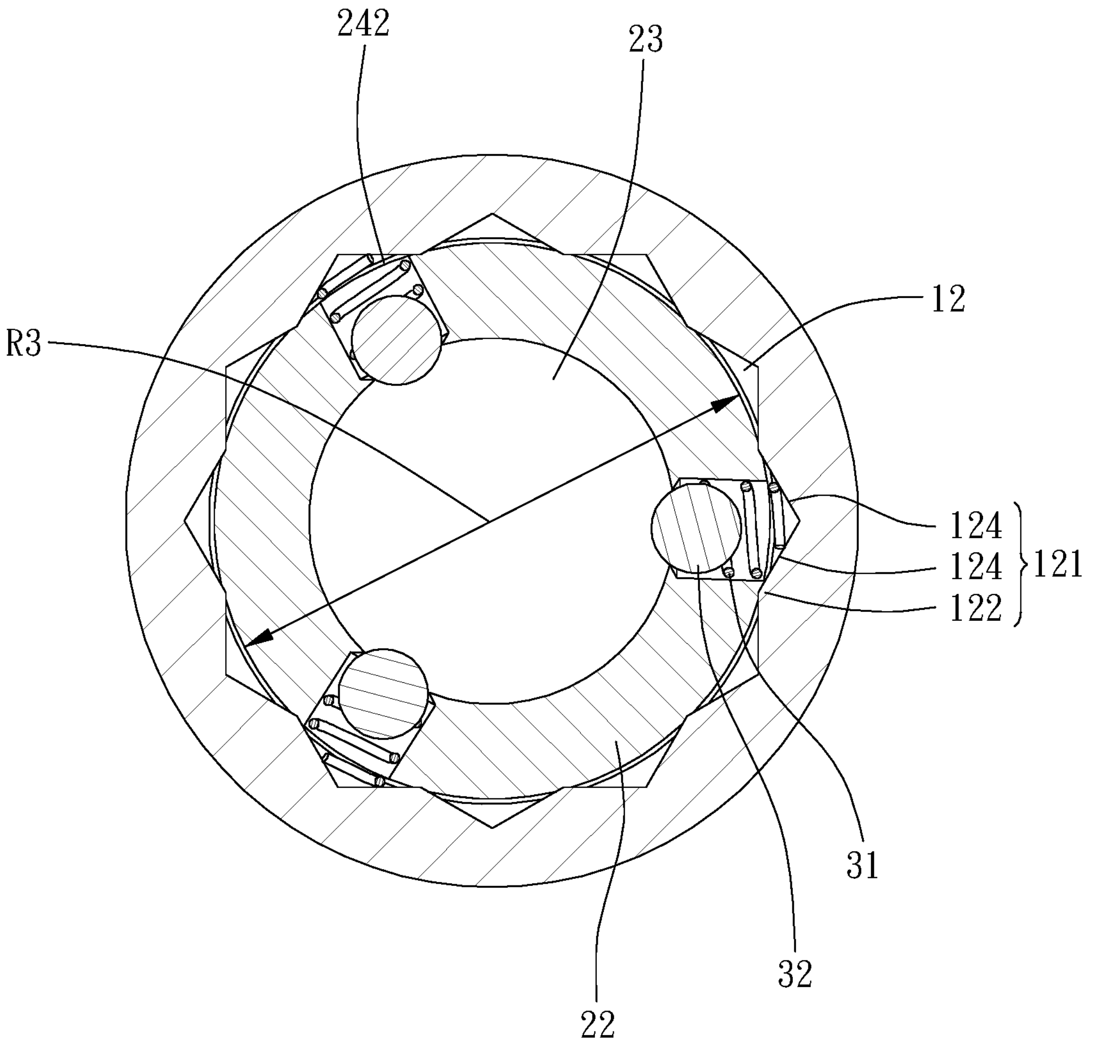
FIG. 7 is another cross-sectional view of the first preferable embodiment of the present invention.

The tubular body 10 defines an axis A, and includes a working portion 11 and a driving portion 13 arranged along a direction in which the axis A extends. The working portion 11 has an axial dimension X1 larger than an axial dimension X2 of the driving portion 13, and the driving portion 13 is configured to be connected with a driving tool. The driving portion 13 includes a connection hole 14, and the working portion 11 includes an assembling hole 12 which is non-circular, the assembling hole 12 is configured to be connected with a hex nut 6 of a spark plug 3 (FIG. 4). The assembling hole 12 has a first inner diametric dimension R1 (FIG. 6), and the assembling hole 12 is in communication with the connection hole 14. The connection hole 14 is quadrilateral and configured to be connected with the driving tool. The socket base 20 is disposed in the assembling hole 12, the socket base 20 includes a large diameter section 21, a small diameter section 22, a receiving hole 23 and a plurality of receiving portions 24, the large diameter section 21 and the small diameter section 22 arranged along a direction in which the axis A extends, the large diameter section 21 has a first outer diametric dimension R2 larger than a second outer diametric dimension R3 of the small diameter section 22, and the first outer diametric dimension R2 is larger than the first inner diametric dimension R1 (FIGS. 5 to 7). The large diameter section 21 is radially abutted against an inner wall 121 of the assembling hole 12, the receiving hole 23 is configured for insertion of the spark plug 3, the plurality of receiving portions 24 are transverse to the axis A and inserted to the socket base 20, and the large diameter section 21 and the small diameter section 22 are integrally connected with each other. In this embodiment, each of the first outer diametric dimension R2 and the second outer diametric dimension R3 is slightly larger than the first inner diametric dimension R1; each of the plurality of positioning units 30 includes an elastic member 31 and a positioning member 32, the elastic member 31 and the positioning member 32 are received in the receiving portion 24, and the elastic member 31 urges the positioning member 32 so that the positioning member 32 at least partially projects within the receiving hole 23 for being engaged within a grooved portion 4 of the spark plug 3. Specifically, the spark plug 3 includes a threaded connection section 8 and an insulation section 5, the threaded connection section 8 and the insulation section 5 are disposed at opposing sides of the hex nut 6, the grooved portion 4 is disposed on the insulation section 5, and the grooved portion 4 includes a plurality of annular grooves 7 arranged in intervals axially (FIG. 7). Whereby, it provides a simple structure to dismount and stably hold the spark plug, and the socket base 20 can be securely fitted to the inner wall 121 of the assembling hole 12.

The second outer diametric dimension R3 is larger than the first inner diametric dimension R1, the small diameter section 22 is radially abutted against the inner wall 121 of the assembling hole 12, and the small diameter section 22 is cylindrical, so that the combination and connection are enhanced.

The elastic member 31 is a ball member, and the plurality of positioning units 30 are configured for engaging the spark plug 3 and withdrawing the spark plug 3 which is unscrewed.

In this embodiment, the socket base 20 is made of plastic material. In assembling, it is to make the socket base 20 correspond to the assembling hole 12, an external force (by pressing or impacting) is applied to the socket base 20 so that the socket base 20 is forced to come into the assembling hole 12, and thus the socket base 20 is quickly connectable to and detachable from the assembling hole 12. As a result, the tubular body 10 does not require an additional space for receiving the socket base 20 so that the assembling hole 12 has a long and sufficient space for various sizes of spark plugs.

Preferably, a bevel 25 is disposed between the large diameter section 21 and the small diameter section 22, a top portion of the assembling hole 12 includes an inclined surface 111, and the bevel 25 is abuttable against the inclined surface 111 so that the large diameter section 21 can come into the assembling hole 12 smoothly.

The large diameter section 21 is farther from the driving portion 13 than the small diameter section 22, and each of the plurality of receiving portions 24 is inserted to the small diameter section 22, which is advantageous for withdrawing the spark plug 3.

Figure 1:
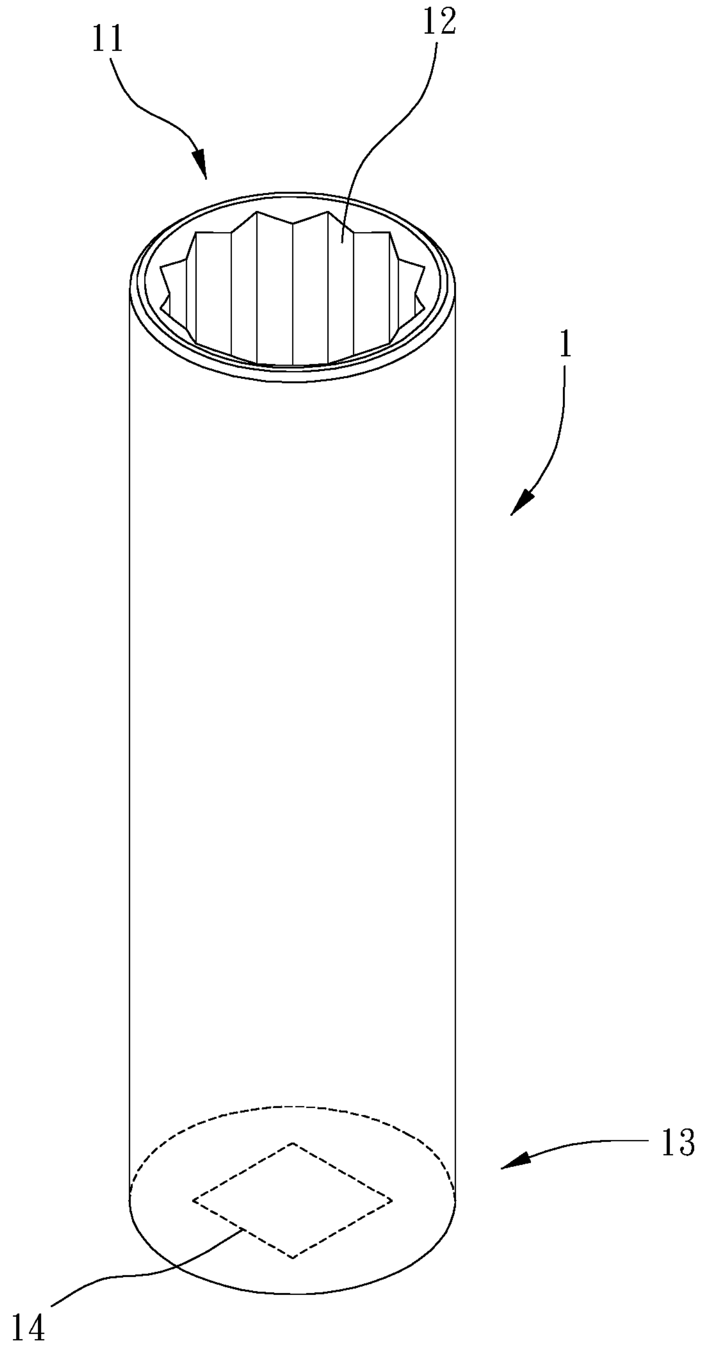
FIG. 1 is a stereogram of a first preferable embodiment of the present invention.
Figure 2:
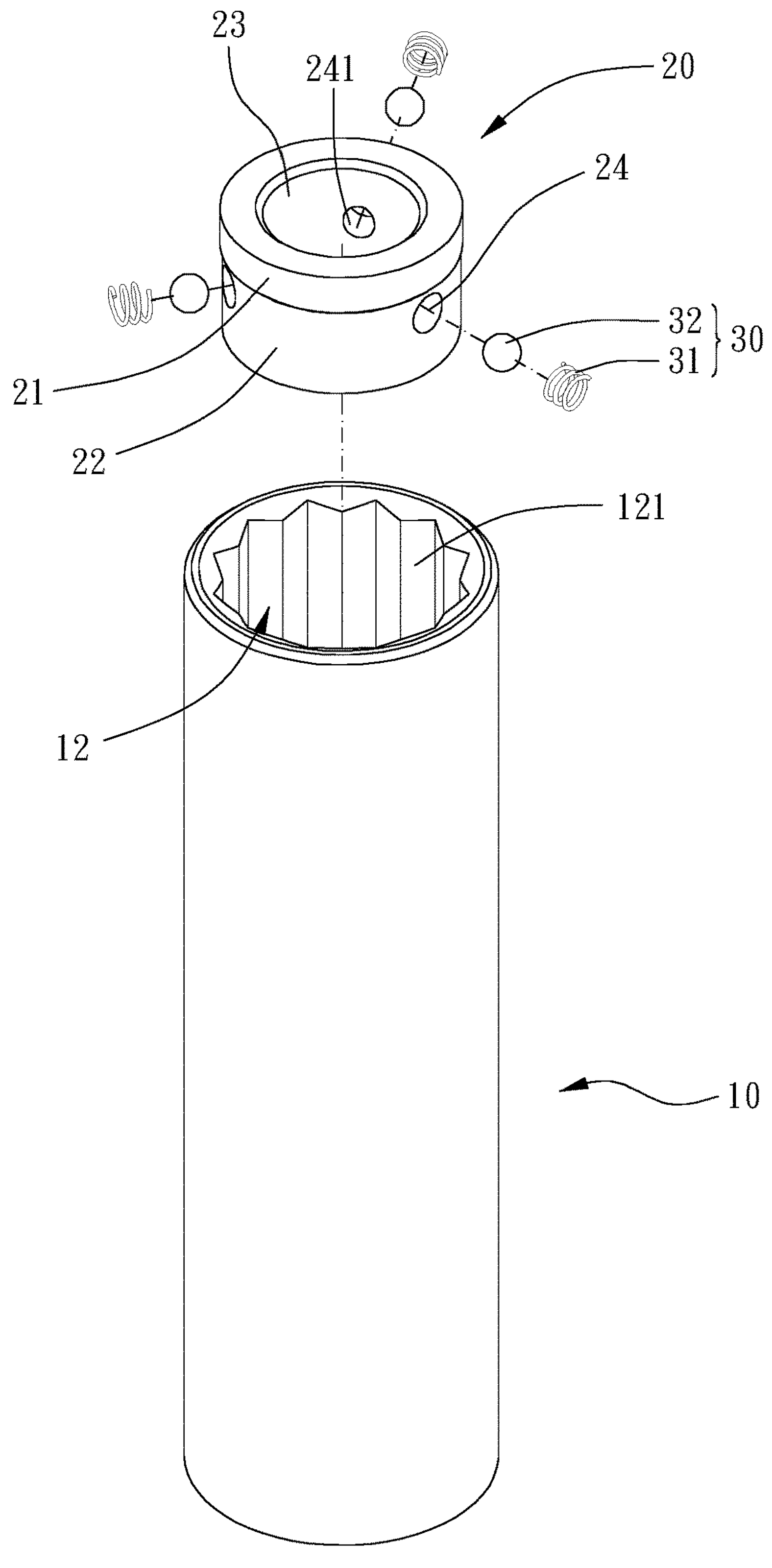
FIG. 2 is a breakdown drawing of the first preferable embodiment of the present invention.
Figure 3:
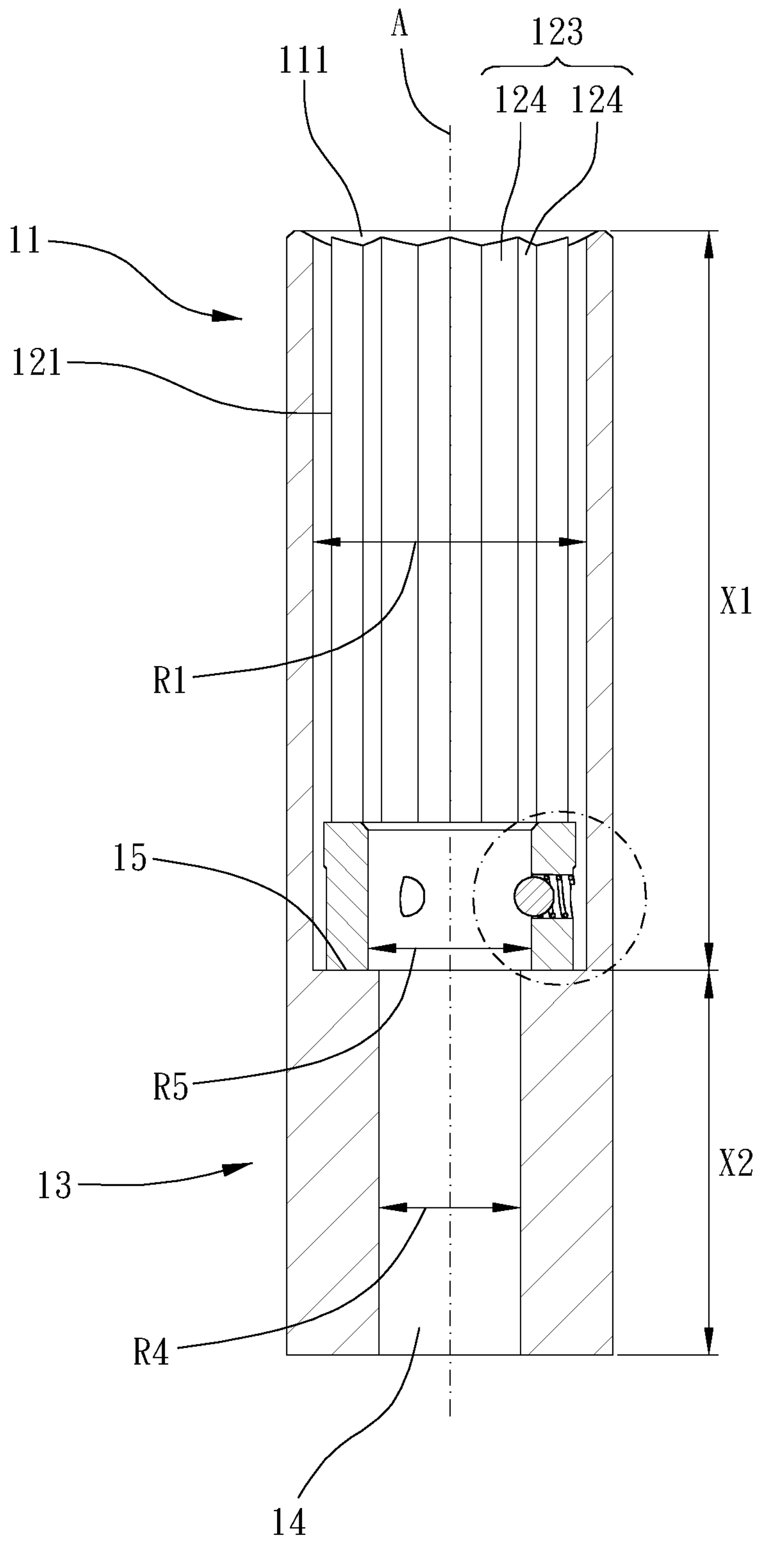
FIG. 3 is a cross-sectional view of the first preferable embodiment of the present invention.
Figure 3A:
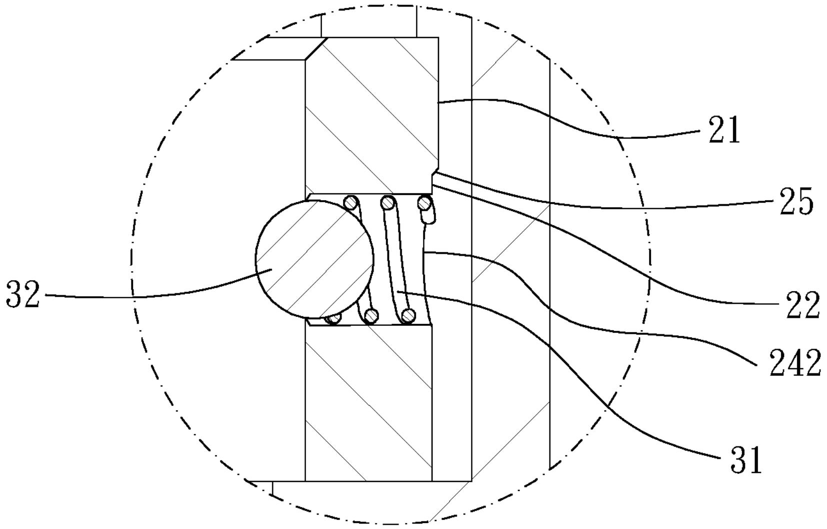
FIG. 3A is a partial enlargement of FIG. 3.

Please refer to FIG. 3, the assembling hole 12 is adjacent to the connection hole 14, the connection hole 14 has a second inner diametric dimension R4 smaller than the first inner diametric dimension R1 of the assembling hole 12, a first stepped portion 15 is formed between the connection hole 14 and the assembling hole 12, and the socket base 20 is axially abutted against the first stepped portion 15, which is advantageous for engagement of the elastic member 31 within the grooved portion 4 of the spark plug 3.

Each of the plurality of receiving portions 24 is a through hole disposed through the socket base 20, each of the plurality of receiving portions 24 includes a first opening 241 and a second opening 242 corresponding to each other, the first opening 241 is open toward the receiving hole 23, the second opening 242 is open radially toward the inner wall 121 of the assembling hole 12, an end of the elastic member 31 is disposed through the second opening 242 and abutted against the inner wall 121 of the assembling hole 12, and another end of the elastic member 31 is abutted against the positioning member 32 so that the positioning member 32 is at least partially protrusive out from the first opening 241. Specifically, the assembling hole 12 is polygonal. Preferably, the assembling hole 12 is dodecagonal or the like, the inner wall 121 of the assembling hole 12 includes a plurality of convex portions 122 arranged circumferentially, the large diameter section 21 is cylindrical, and the plurality of convex portions 122 are radially abutted against an outer circumferential surface 211 of the large diameter section 21. In this embodiment, each of the plurality of convex portions 122 is corner-shaped; however, each of the plurality of convex portions 122 may be arcuate or tooth-shaped; each of the plurality of convex portions 122 has an axial extent larger than an axial extent of the socket base 20; two of the plurality of convex portions 122 located diametrically define the first inner diametric dimension R1. The assembling hole 12 further includes a plurality of grooves 123 arranged circumferentially, the plurality of grooves 123 and the plurality of convex portions 122 are alternatively arranged circumferentially, at least parts of the plurality of grooves 123 correspond to the plurality of receiving portions 24, and an end of the elastic member 31 is engaged within one of the plurality of grooves 123; each of the plurality of grooves 123 and the outer circumferential surface 211 form a gap therebetween. In this embodiment, each of the plurality of grooves 123 is V-shaped, each of the plurality of grooves 123 includes two inclined surfaces 124 transverse to each other, and the elastic member 31 is abutted against the two inclined surfaces 124 so that the elastic member 31 is stably assembled and functions stably and so that the elastic member 31 can bear the torque force during the rotational motion of the socket base 20. As shown in FIG. 3, the receiving hole 23 has a third inner diametric dimension R5 larger than the second inner diametric dimension R4.

The plurality of positioning units include at least three the positioning unit 30, and the at least three positioning units 30 are equiangularly disposed on the socket base 20, providing good and even holding effect to the spark plug 3.

Figure 8:
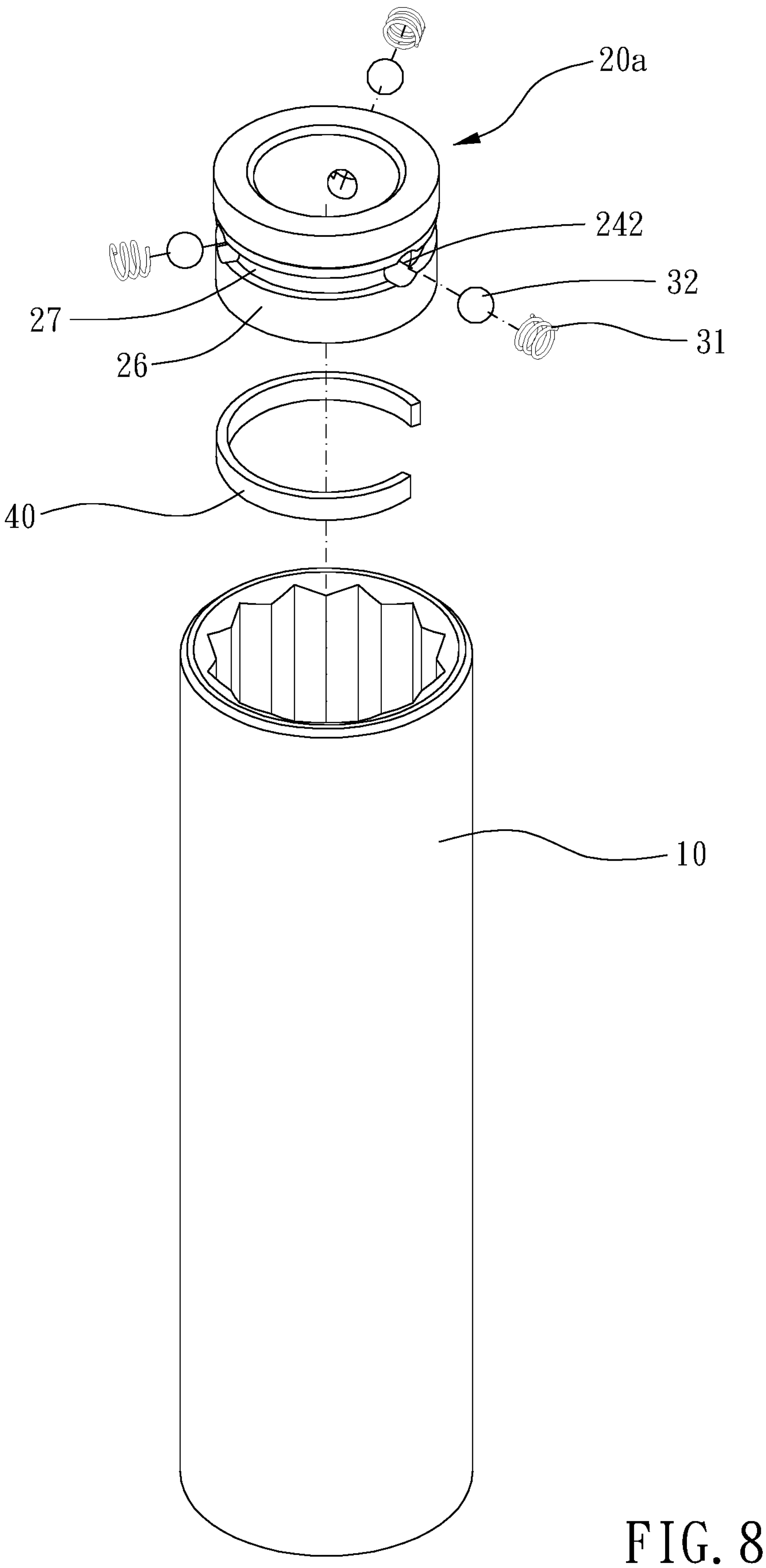
FIG. 8 is a breakdown drawing of a second preferable embodiment of the present invention.
Figure 9:
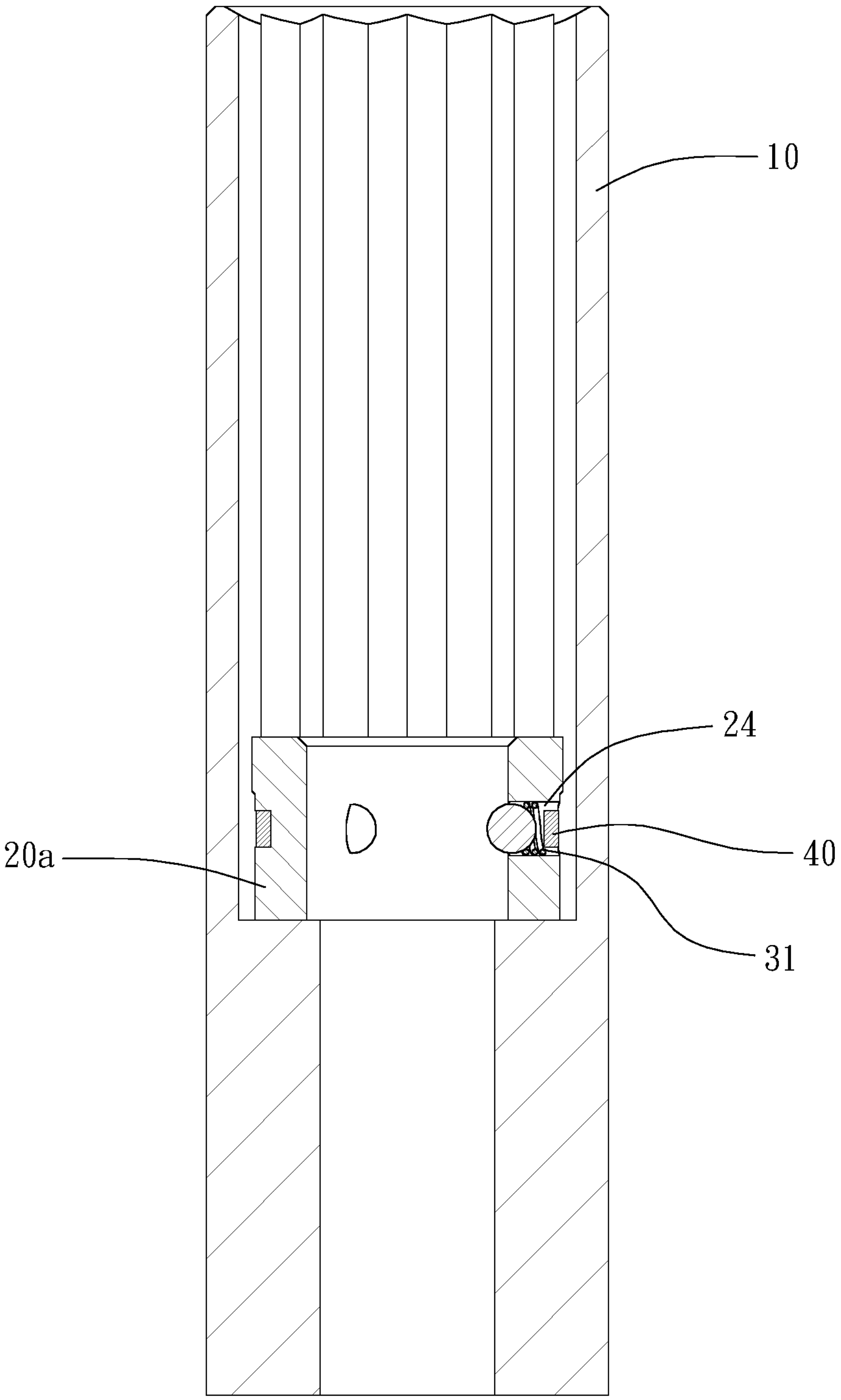
FIG. 9 is a cross-sectional view of the second preferable embodiment of the present invention.
Figure 10:
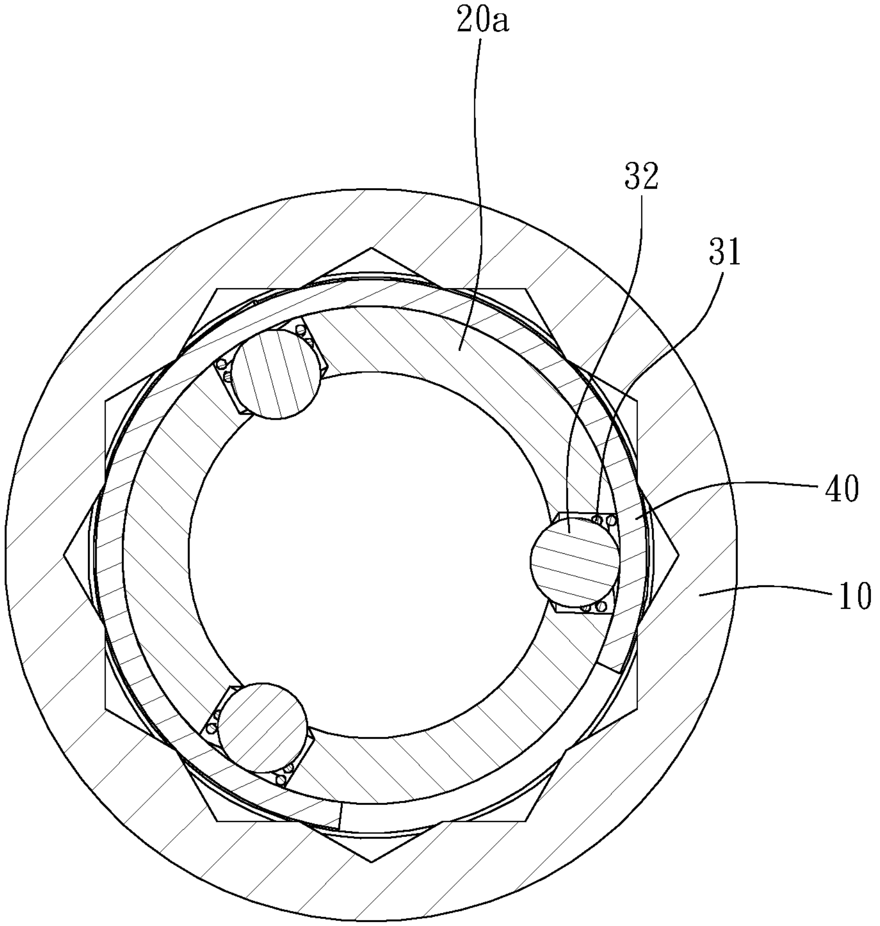
FIG. 10 is another cross-sectional view of the second preferable embodiment of the present invention.

FIGS. 8-10 show a second embodiment, the spark plug wrench further includes an elastic retainer 40, the socket base 20*a* further includes an outer surface 26 and an annular groove 27, the plurality of receiving portions 24 are disposed through the outer surface 26 of the socket base 20 and the inner wall 121 of the assembling hole 12, the annular groove 27 is annularly disposed on the outer surface 26 of the socket base 20 and corresponds to the second opening 242, the elastic retainer 40 is received in the annular groove 27 and extends across the second opening 242, and the elastic member 31 corresponds to the elastic retainer 40. The elastic retainer 40 can block the elastic member 31 from detaching from the receiving portion 24. In this embodiment, the elastic retainer 40 is C-shaped.

Figure 11:
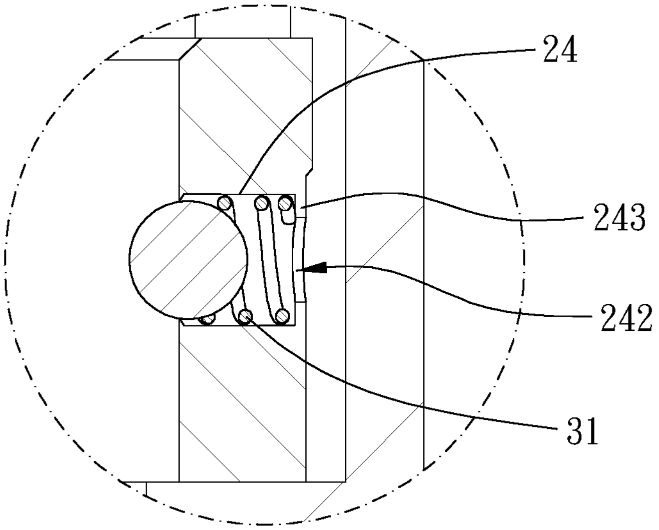
FIG. 11 is a drawing showing a third of the present invention.

FIG. 11 shows a third embodiment. Each of the plurality of receiving portions 24 further includes a flange 243, the flange 243 radially projects within the second opening 242, and the elastic member 31 is axially abutted against the flange 243 so that the elastic member 31 is prevented from detachment.

Figure 12:
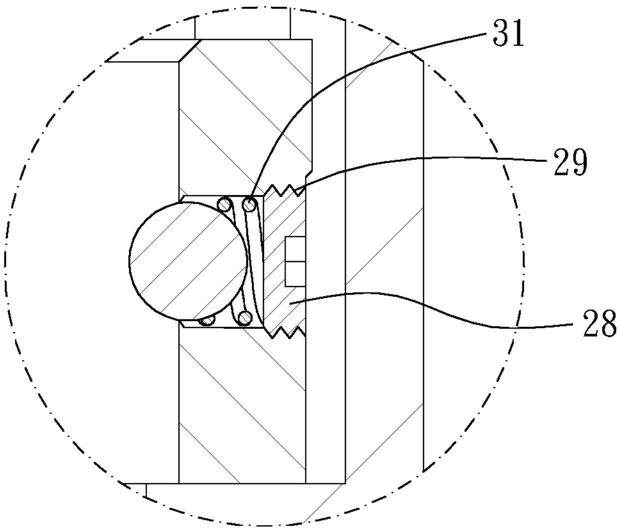
FIG. 12 is a drawing showing a fourth of the present invention.

FIG. 12 shows a third embodiment. An end of each of the plurality of receiving portions 24 further includes a threaded section 29, the threaded section 29 is screwed to a bolt 28, and the elastic member 31 axially urges the bolt 28.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A spark plug wrench, including:

a tubular body, defining an axis, including a working portion and a driving portion arranged along a direction in which the axis extends, the working portion having an axial dimension larger than an axial dimension of the driving portion, the driving portion being configured to be connected with a driving tool, the driving portion including a connection hole, the working portion including an assembling hole which is non-circular and has a fixed cross-section, the assembling hole including a first inner diametric dimension, the assembling hole being in communication with the connection hole;

a socket base, entirely disposed within the assembling hole, including a large diameter section, a small diameter section, a receiving hole and a plurality of receiving portions, the large diameter section and the small diameter section arranged along a direction in which the axis extends, the large diameter section having a first outer diametric dimension larger than a second outer diametric dimension of the small diameter section, the large diameter section being radially abutted against an inner wall of the assembling hole, the receiving hole being configured for insertion of a spark plug, the plurality of receiving portions being transverse to the axis and inserted to the socket base; and a plurality of positioning units, each of the plurality of positioning units including an elastic member and a positioning member, the elastic member and the positioning member being received in the receiving portion, the elastic member urging the positioning member so that the positioning member at least partially projects within the receiving hole for being engaged within a grooved portion of the spark plug;

wherein the assembling hole is polygonal, the assembling hole includes a plurality of convex portions arranged circumferentially, the large diameter section is cylindrical, and the plurality of convex portions are radially abutted against an outer circumferential surface of the large diameter section;

wherein the assembling hole further includes a plurality of grooves arranged circumferentially, the plurality of grooves and the plurality of convex portions are alternatively arranged circumferentially, at least parts of the plurality of grooves correspond to the plurality of receiving portions, and an end of the elastic member is engaged within one of the plurality of grooves;

wherein the small diameter section is located between the large diameter section and the connection hole;

wherein the plurality of convex portions are partially snapped within the large diameter section.

2. The spark plug wrench of claim 1, wherein the large diameter section is farther from the driving portion than the small diameter section, and each of the plurality of receiving portions is inserted to the small diameter section.

3. The spark plug wrench of claim 1, wherein the assembling hole is adjacent to the connection hole, the connection hole has a second inner diametric dimension smaller than the first inner diametric dimension of the assembling hole, a first stepped portion is formed between the connection hole and the assembling hole, and the socket base is axially abutted against the first stepped portion.

4. The spark plug wrench of claim 1, wherein each of the plurality of receiving portions a through hole disposed through the socket base, each of the plurality of receiving portions includes a first opening and a second opening corresponding to each other, the first opening is open toward the receiving hole, the second opening is open radially toward the inner wall of the assembling hole, an end of the elastic member is disposed through the second opening and abutted against the inner wall of the assembling hole, and another end of the elastic member is abutted against the positioning member so that the positioning member is at least partially protrusive out from the first opening.

5. The spark plug wrench of claim 1, wherein each of the plurality of grooves is V-shaped, each of the plurality of grooves includes two inclined surfaces transverse to each other, and the elastic member is abutted against the two inclined surfaces.

6. The spark plug wrench of claim 5, wherein each of the plurality of convex portions is corner-shaped; two of the plurality of convex portions located diametrically define the first inner diametric dimension; each of the plurality of grooves and the outer circumferential surface form a gap therebetween; the plurality of positioning units include at least three positioning units, and the at least three positioning units are equiangularly disposed on the socket base; the large diameter section is farther from the driving portion than the small diameter section, and each of the plurality of receiving portions is inserted to the small diameter section; the second outer diametric dimension is larger than the first inner diametric dimension, and the small diameter section is radially abutted against the inner wall of the assembling hole; the assembling hole is adjacent to the connection hole, the connection hole has a second inner diametric dimension smaller than the first inner diametric dimension of the assembling hole, a first stepped portion is formed between the connection hole and the assembling hole, and the socket base is axially abutted against the first stepped portion; the receiving hole has a third inner diametric dimension larger than the second inner diametric dimension; a bevel is disposed between the large diameter section and the small diameter section, a top portion of the assembling hole includes an inclined surface, and the bevel is abuttable against the inclined surface; each of the plurality of convex portions has an axial extent larger than an axial extent of the socket base.

7. The spark plug wrench of claim 1, further including an elastic retainer, wherein the socket base further includes an outer surface and an annular groove, the plurality of receiving portions are disposed through the outer surface of the socket base and the inner wall of the assembling hole, each of the plurality of receiving portions is a through hole disposed through the socket base, each of the plurality of receiving portions includes a first opening and a second opening corresponding to each other, the first opening is open toward the receiving hole, the second opening is open radially toward the inner wall of the assembling hole, the annular groove is annularly disposed on the outer surface of the socket base and corresponds to the second opening, the elastic retainer is received in the annular groove and extends across the second opening, and the elastic member corresponds to the elastic retainer.

8. The spark plug wrench of claim 1, wherein each of the plurality of receiving portions a through hole disposed through the socket base, each of the plurality of receiving portions includes a first opening and a second opening corresponding to each other, the first opening is open toward the receiving hole, the second opening is open radially toward the inner wall of the assembling hole, each of the plurality of receiving portions further includes a flange, the flange radially projects within the second opening, and the elastic member is axially abutted against the flange.

* * * * *